Figures 1, 2:
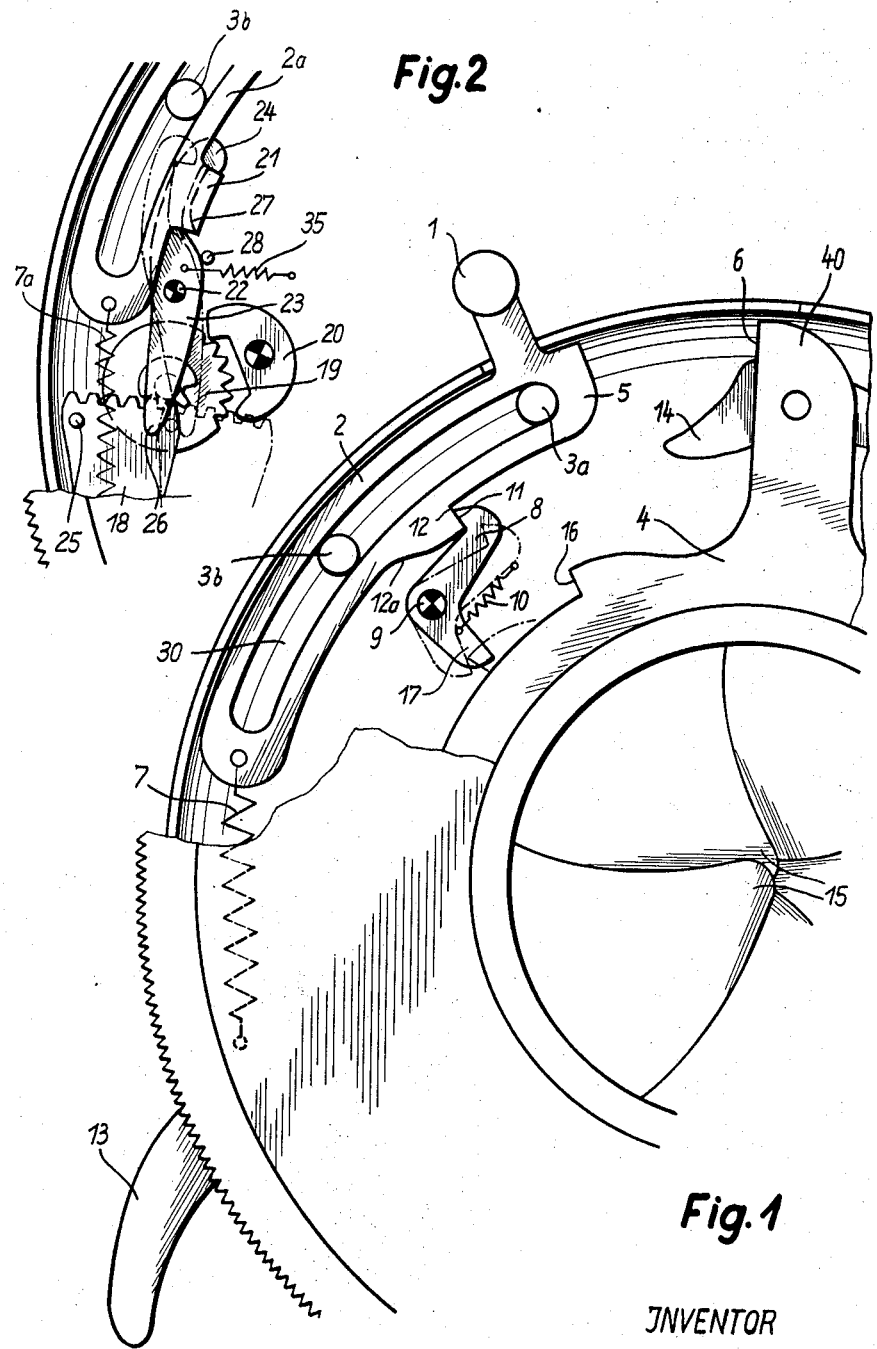

June 9, 1959 — K. GEBELE — 2,889,760
PHOTOGRAPHIC SHUTTER
Filed March 31, 1953

INVENTOR
Kurt Gebele
BY Charles Shepard
ATTORNEY

United States Patent Office 2,889,760
Patented June 9, 1959

2,889,760
PHOTOGRAPHIC SHUTTER

Kurt Gebele, Munich, Germany, assignor to Hans Deckel, Munich-Solln, and Friedrich Wilhelm Deckel, Garatshausen, Post Tutzing, Germany Application March 31, 1953, Serial No. 345,852

Claims priority, application Germany April 2, 1952

3 Claims. (Cl. 95—63)

This invention relates to camera shutters of the kind known as objective shutters or between-the-lens shutters, and comprising a plurality of shutter blades movable from and to a central opening through the shutter, for admitting light to make an exposure on a sensitive element in the focal plane of the camera. A setting device is provided for setting or cocking or tensioning the blade actuating device or master member which, when released, operates to actuate the shutter blades for an exposure. It is one of the objects of this invention to provide simple, and inexpensive means for preventing a second setting or tensioning of the shutter until it has been released to make an exposure.

Another object of the invention is the provision of locking or blocking means for the shutter tensioning parts, of such simple and compact character that they may be mounted in the usual limited space of a shutter case.

A still further object of the invention is the provision of a camera shutter of this kind in which the setting devices are engaged by locking means when the shutter is set, which locking means are automatically released when an exposure is made.

This invention is particularly useful in connection with cameras in which the shutter cocking is coupled with the film feeding mechanism, since in such cameras the film feed cannot be operated without cocking the shutter, and if the shutter setting or cocking devices are locked, the film feeding devices will also be locked, so that special film feed locking devices within the camera become unnecessary. It will be noted that if the film cannot be operated while the shutter is set or tensioned, the unexposed section of the film in the exposure area of the camera cannot be moved out of the exposure area, and an accidental unexposed section or "frame" of film on the exposed strip is prevented.

These and other desirable objects may be attained in the manner disclosed as an illustrative embodiment of the invention in the following description and in the accompanying drawings forming a part hereof, in which:

Fig. 1 is a fragmentary view of a camera shutter illustrating one possible embodiment of the invention, a part of the shutter housing being broken away to expose underlying parts, and many conventional parts being omitted; and Fig. 2 is a similar view of another embodiment of the invention in which the locking devices for the setting member are released by the flash timing or synchronizing mechanism.

The same reference numerals throughout the several views indicate the same parts.

In both figures of the drawings there are illustrated only those parts of the mechanism which are necessary to an understanding of the present invention by one already familiar with the construction of shutters of this general type, many of the conventional shutter parts being omitted from the illustration. The present invention is shown as being applied to a well known type of shutter in which the principal operating parts are disclosed, for example, U.S. Patent No. 1,687,123, granted October 9, 1928, for an invention of Friedrich Deckel et al.

Referring particularly to Fig. 1 of the drawings, the shutter illustrated comprises a casing or housing of generally circular form having a central opening therethrough which is normally closed by means of a plurality of blades 15 movable from a closed position to open position and back to closed position to make an exposure on a sensitive element in the focal plane of the camera. A master member 4 for operating the shutter blades is mounted for oscillation on the circular inner wall of the shutter and is rotated on said wall to actuate the shutter blades in known manner when the master member turns leftwardly or counterclockwise. For example, an operating member 14 pivoted on a radial projection 40 on the master member and corresponding in general to the operating member 22 in said patent, engages and moves the blade ring, not shown in the present drawings but shown at 14 in said prior patent, and this blade ring in turn is pivoted to the present shutter blades 15.

A shutter setting or tensioning member 2 is mounted in the casing to slide in an arcuate path concentric with the shutter casing, and is guided on the studs or projections 3a and 3b which project from the casing into an arcuate slot 30 in the setting member. The setting member 2 has a finger piece 1 that projects outwardly through an elongated opening or slot in the outer wall of the shutter casting. The projections 3a and 3b engage opposite ends of the slot to limit the movements of the setting member in opposite directions. A spring 7 tends resiliently to hold it in contact with the stud 3a, as shown in the drawings.

Pivoted at 9 in the shutter casing is a bell crank lever 8 terminating in a pawl 11 at one end and a tail or projection 17 at its other end. A spring 10 secured to the lever 8 and anchored in the shutter casing resiliently urges the lever to turn in a counterclockwise direction, as seen in the drawings. The pawl or hook 11 on the lever 8 is adapted to engage a projection or shoulder 12 on the setting member to lock it in its rest position shown in the drawing. When the pawl 11 of the bell crank lever is engaged with the setting member, its opposite end or tail 17 lies in the path of a projection or shoulder 16 on the master member 4.

In the normal or run-down position of the master member 4, the shoulder 16 thereon is in the position shown in broken lines in the drawings, and engages the tail end 17 of the bell crank lever 8 to swing it in a clockwise direction against the tension of its spring 10, and disengages its pawl from the shoulder 12 of setting member, so that the setting member is free for an operation. If the setting member is now moved clockwise against the tension of its spring 7, an abutment 5 on its forward end is brought into engagement with a shoulder or projection 6 projecting from the master member, and the master member is moved thereby to the full line position shown in the drawing, in which position it is retained by well known latching means, not shown in the drawings. This movement of the master member releases the lever 8 which swings to the full line position shown, under the action of its spring 10. When the setting member 2 is released it also returns to the position shown in the drawing under the influence of its spring 7, and an inclined cam 12a adjacent the shoulder 12 swings the lever 8 out of its path until it snaps behind and engages with the projection 12, just as the member 2 reaches its rest position. With the parts in this position the shutter is set for an exposure and the setting member 2 is locked against a second operation.

The shutter may be released to make an exposure by operation of the trigger or finger piece 13 in a well known manner. When released, the master member 4 is turned in the shutter casing in a counterclockwise direction by a main spring, not shown, and moves the cam member 14 to actuate the shutter blades 15 from closed position shown in the drawings to open position for an exposure, and back to closed position. After this operation, the master member comes to rest with its lug 16 in engagement with the tail 17 of the bell crank lever 8, after swinging the bell crank lever to disengage the setting member 2 so that the latter is free to be operated again.

In Fig. 2 of the drawings, devices are shown for releasing the setting member by means connected with the flash timing or synchronizing mechanism of known construction and which may, for example, be similar to that shown in Deckel German Patent 863,748, published January 19, 1953, the disclosure of which is available in the English language in my United States Patent 2,650,526, issued on September 1, 1953, on an application filed September 19, 1951. The setting member 2a corresponds to the setting member 2 shown in Fig. 1, except for a difference in the manner in which it is latched against movement. This setting member 2a has a lug or projection 21 adapted to be engaged by a projection or nose 24 on one end of a lever 23 pivoted at 22 in the shutter casing. The other end of this lever has a tail 26 which lies in the path of a pin or projection 25 on the flash timing or synchronizing member 18 which corresponds in general to the synchronizing member 24 in the above noted German Patent and U.S. Patent 2,650,526. A spring 35 secured to the lever 23 and anchored to the shutter casing tends to swing the lever clockwise in engagement with a fixed stop 28, in which position its nose 24 engages the lug 21 on the setting member 2a. The flash timing or synchronizing member 18 is of a construction well understood in the art, and during the setting of the shutter this member 18 swings leftwardly in known manner, (see Figs. 1 and 2 of Patent 2,650,526), from the dotted line rest position to the full line set position shown in Fig. 2. During its run-down movement from said set position to said rest position the synchronizing member 18 operates in known manner a flashlight contact device not shown. The rate of this run-down movement being controlled by the gearing 19 and the escapement pallet or anchor 20.

With the synchronizing member 18 in the rest or dotted line position shown in Fig. 2, which it occupies at the conclusion of an exposure operation of the shutter, the projection 25 on the member 18 engages the tail end 26 of the lever 23 and holds its nose 24 out of engagement with the projection 21, against the force of the spring 35. The setting member 2a is now free to be operated to set or tension the shutter for an exposure. During the tensioning of the shutter, the synchronizer 18 is also set and moves leftwardly or counterclockwise to the full line position seen in Fig. 2, and carries the pin 25 with it to release the lever 23, which then swings clockwise under the action of the spring 35 into engagement with the stop 28. When the setting member 2a is released and makes its return movement under the action of its spring 7a, a cam 27 associated with the lug 21 serves to swing the nose 24 out of the path of the lug 21 on the return movement, until the setting member 2a reaches its home or rest position, whereupon the nose or pawl 24 snaps behind the shoulder 21 into the position shown in full lines in Fig. 2, and the setting member 2a is once more locked against operation until another exposure is made.

If the fingerpiece 13 is now operated to release the master member for an exposure, the flash timer or synchronizer 18 moves back to the broken line position shown in Fig. 2 and swings the lever 23 to disengage its pawl from the setting member, so that the shutter can again be set or tensioned.

It is seen from the foregoing disclosure that the above-mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a casing, a master member movable within said casing from an untensioned rest position to a tensioned position ready to make an exposure and movable to return from its tensioned position to its rest position when making an exposure, said master member being wholly enclosed within said casing and not directly accessible externally of the casing, a slot in a wall of said casing, an elongated setting member slidable within said casing between a rest position and a tensioned position, stop means for preventing movement of said setting member beyond these said positions, first spring means urging said setting member toward said rest position, said setting member having an operating handle extending through said slot and accessible externally of the casing so that said setting member may be manually moved toward its tensioned position to engage said master member and move said master member from its rest position toward its tensioned position, said setting member returning toward its rest position under actuation of said first spring means independently of and in advance of return movement of said master member toward its rest position, an abutment shoulder and cam surface on said setting member, a latch lever pivotally mounted intermediate its ends and having one arm provided with a nose for sliding past said cam surface as said setting member returns to its rest position and for subsequently engaging said shoulder to hold said setting member from movement away from its rest position, second spring means tending to maintain said nose of said latch lever in latching engagement with said abutment shoulder, said lever having a second arm for actuation to release said nose, and a releasing shoulder carried by said master member for engaging said second arm of said latch lever to release said latch lever as said master member moves from its tensioned to its rest position, whereby said setting member may be moved to tension said master member again.

2. A photographic objective shutter of the type having an annular casing, a master member movable in said casing from a rest position to a tensioned position when tensioning the shutter ready to make an exposure and returning from tensioned position to rest position during the making of an exposure, a shutter setting member movable within said casing through a setting movement from a rest position to a tensioned position and engaging said master member during such setting movement to move said master member to its tensioned position, said setting member being mainly within said annular casing in an inaccessible position therein and having a finger piece projecting outwardly through a slot in a wall of said casing to a position accessible for manual actuation, and a spring returning said setting member to its rest position when manual pressure on said finger piece is released at the conclusion of a setting movement, characterized by the provision of a latching lever located in a position between said master member and said setting member for oscillating movement on a pivot also located between said master member and setting member, a latching nose on said latching member, a latch spring tending to turn said latching lever in a direction to keep said nose engaged with said setting member, a latching shoulder on said setting member in position to be engaged by said latching nose when said setting member is in its rest position so that said latching lever may hold said setting member against setting movement from its rest position toward its tensioned position, and a releasing shoulder on said master member for engaging said latching lever during a return movement of said master member from its tensioned position to its rest position, to move said latching lever to unlatched position so that said setting member may be moved again through a setting movement.

3. A photographic objective shutter of the type having an annular casing having an approximately cylindrical outer wall and an approximately cylindrical inner wall arranged substantially concentrically with the outer wall and defining an exposure aperture through which light may be admitted when making a photographic exposure, a master member movable in the annular space between said outer and inner walls from a rest position to a tensioned position when tensioning the shutter ready to make an exposure and returning from tensioned position to rest position during the making of an exposure, a shutter setting member movable within said casing in the annular space between said two walls and in a path of travel substantially concentric with said two walls, from a rest position to a tensioned position and effective during such movement to move said master member to its tensioned position, said setting member being mainly within said annular casing in an enclosed and inaccessible position therein and having a finger piece projecting outwardly through a slot in a wall of said casing to a position accessible for manual actuation, and a spring returning said setting member to its rest position when manual pressure on said finger piece is released at the conclusion of a setting movement, characterized by the provision of a stationary pivot pin mounted in said casing in said annular space between said two cylindrical walls, a latching lever pivotally mounted on said pin for oscillation thereon between a rest position and a displaced position, said lever when in rest position serving to block movement of said setting member from its rest position to its tensioned position, a spring tending to hold said latching lever in its rest position, said latching lever being engaged and temporarily displaced by said setting member during return movement of said setting member from its tensioned position to its rest position, said latching lever then returning to its said rest position under the influence of said spring upon completion of the return movement of said setting member, and means located in said annular space between said walls of said casing and operative during the making of an exposure, for displacing said latching lever from its said rest position to a displaced position out of the path of said setting member so that said setting member may again be moved from its rest position to its tensioned position to tension the master member ready to make another exposure.

References Cited in the file of this patent

UNITED STATES PATENTS

| | | |
|---|---|---|
| 2,104,094 | Nerwin | Jan. 4, 1938 |
| 2,301,956 | Kuppenbender et al. | Nov. 17, 1942 |
| 2,333,807 | Mihalyi | Nov. 9, 1943 |
| 2,448,876 | Fuerst | Sept. 7, 1948 |